United States Patent [19]

Lanzarini et al.

[11] Patent Number: 4,763,767
[45] Date of Patent: Aug. 16, 1988

[54] TORSIONAL DAMPER DEVICE

[75] Inventors: Ernesto Lanzarini, Moncalieri; Renzo Franchi, Santena, both of Italy

[73] Assignee: Valeo, Paris, France

[21] Appl. No.: 875,237

[22] Filed: Jun. 16, 1986

[30] Foreign Application Priority Data

Jun. 14, 1985 [FR] France .................. 85 09017

[51] Int. Cl.⁴ .................................... F16D 3/14
[52] U.S. Cl. .................. 192/106.2; 464/87; 464/92
[58] Field of Search .............. 192/106.1, 70.17; 464/87, 89, 92

[56] References Cited

U.S. PATENT DOCUMENTS

| | | | |
|---|---|---|---|
| 2,118,913 | 5/1938 | Bachman | 192/70.17 |
| 2,299,029 | 10/1942 | Nutt | 192/106.1 |
| 2,556,624 | 6/1951 | Macbeth et al. | 192/106.1 |
| 4,588,773 | 12/1985 | Schäfer | 192/70.17 |
| 4,613,029 | 9/1986 | Beccaris | 192/106.1 |

FOREIGN PATENT DOCUMENTS

| | | |
|---|---|---|
| 2639661 | 3/1978 | Fed. Rep. of Germany . |
| 1377143 | 9/1964 | France ......................... 192/106.1 |
| 2305637 | 10/1976 | France ......................... 192/106.1 |
| 2493447 | 5/1982 | France . |
| 2494795 | 5/1982 | France . |
| 58-631 | 1/1983 | Japan . |
| 2068508 | 8/1981 | United Kingdom . |

*Primary Examiner*—Leslie A. Braun
*Assistant Examiner*—David A. Testardi
*Attorney, Agent, or Firm*—Young & Thompson

[57] ABSTRACT

A torsional damper device suitable for automobile vehicles comprises a driving part, an intermediate part and a driven part disposed coaxially and rotatable relative to each other within predetermined limits of relative angular displacement. Lost motion meshing teeth between the driving, intermediate and driven parts are adapted to determine these predetermined limits of relative angular displacement. First and second circumferentially acting spring units between the driving, intermediate and driven parts oppose relative angular displacement of these parts for at least two ranges of relative angular displacement. Lost motion meshing teeth between the driving, intermediate and driven parts define these two ranges of relative angular displacement. A first plurality of elements in the driving part include a friction disk and at least a disk to support and center it. An annular elastomer member has one side constrained to rotate with a guide ring and has its opposite side constrained to rotate with the intermediate member which is a hub plate. The first group of elements includes and rotates with the guide ring. At least one annular metal part which may be an adhesion plate separate from the guide ring or the guide ring itself is joined to one radial surface of the annular elastomer member. This annular elastomer member constitutes at least part of the first circumferentially acting spring unit. The annular elastomer member has at least an inner part of trapezoidal transverse cross section. The shorter parallel side of the trapezoidal cross section is nearer the axis of the device.

14 Claims, 6 Drawing Sheets

FIG. 2
FIG. 4
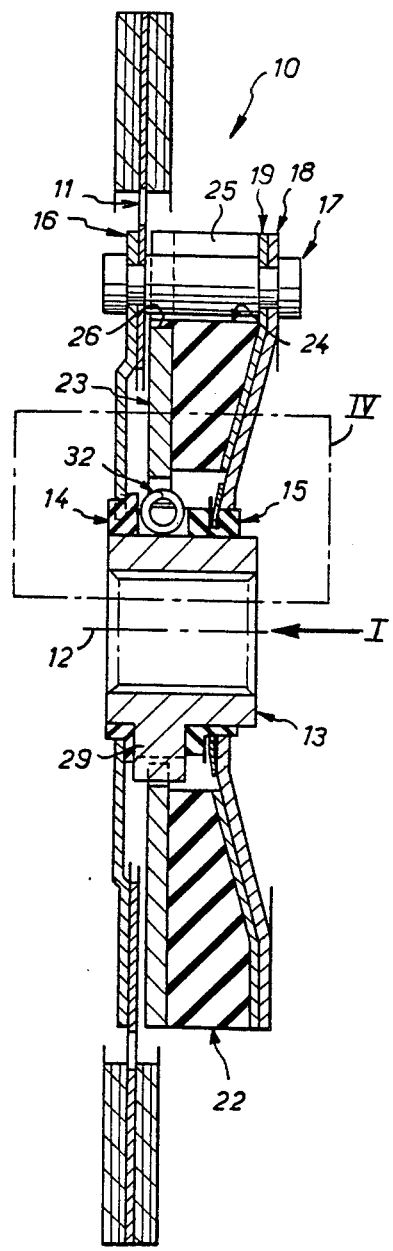
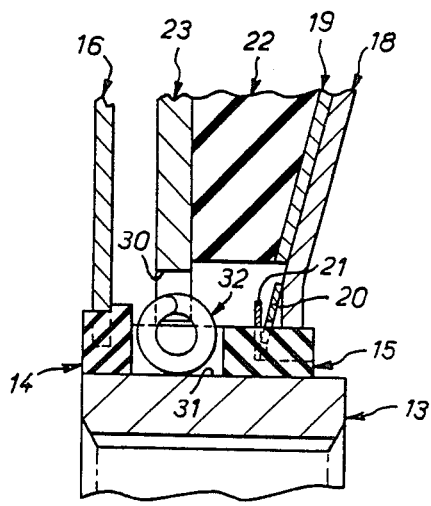

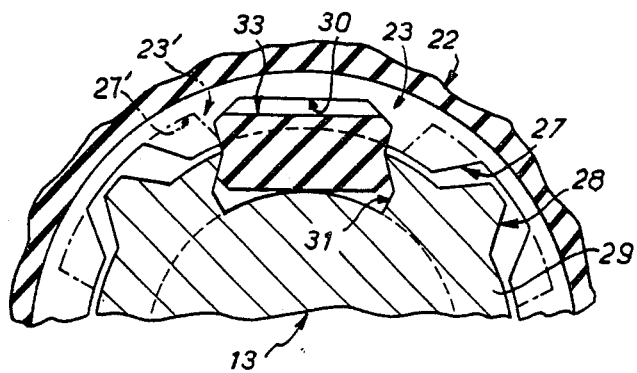
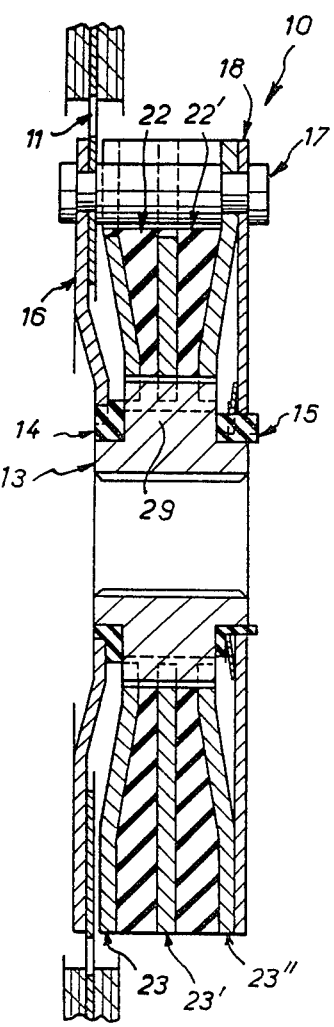
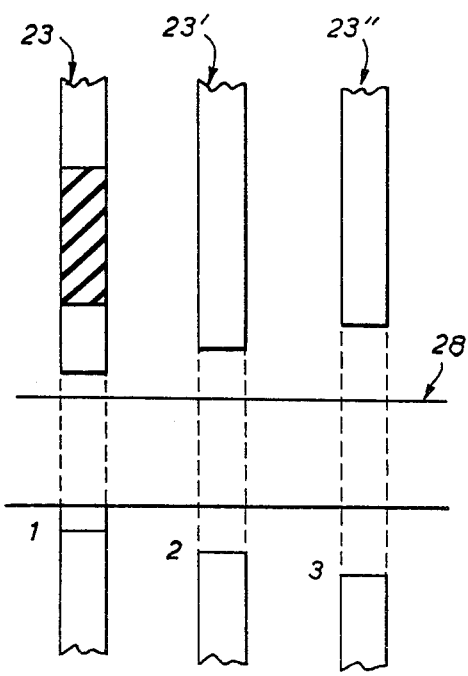

TORSIONAL DAMPER DEVICE

BACKGROUND OF THE INVENTION

1. Field of the Invention

The present invention is generally concerned with torsional damper devices, in particular those for automobile vehicle clutches, which comprise at least three coaxial elements: a driven hub, a hub plate driving the latter in rotation with lost motion, and a drive system comprising a friction facing support disk, these coaxial elements being mounted to rotate relative to each other against spring means having at least two degrees of stiffness and over at least two predetermined sectors of relative angular displacement limited by the angular travel of meshing means.

2. Description of the Prior Art

In practise, these meshing means are of two types known per se:

A first, so-called main meshing means in which angular displacement takes place against so-called main spring means of greater stiffness consists of at least one drive means adapted to move angularly between two abutment means.

In many cases the drive means comprise at least one axial spacer, more often than not a spacer between the friction facing support disk to which it is fastened and a rotary element constrained to rotate with the latter and held at a predetermined axial distance from it.

The two abutment means determining the circumferential angular displacement of each spacer conventionally comprise the substantially radial edges of a notch formed in rotary elements, the hub plate, for example, disposed axially between the friction facing support disk and the rotary element fastened to it.

A second, so-called secondary meshing means, in which the relative angular displacement takes place against so-called secondary spring means of lower stiffness, consists in two inter-engaging concentric toothed means featuring a predetermined angular clearance.

Thus when a torsional couple is applied from the driving part, the driving part during a first phase rotates relative to the driven part against the secondary spring means, of lower stiffness, until the limits of relative angular displacement of the secondary meshing means are reached.

If the torsional torque is such that these limits are reached, relative displacement of the driven part, meaning the hub, takes place beyond these limits in a second phase against the main spring means of higher stiffness which, given their stiffness relative to that of the secondary spring means, behave as a rigid block during the first phase.

If the limits of relative angular displacement of the main meshing means are reached, then total coupling is achieved between the driving and driven parts.

The relative angular displacement between the friction facing support disk and the hub therefore takes place in succession against two stages of spring means of different stiffness and friction means. In the known manner this makes it possible to filter vibrations, especially when the vehicle is in neutral. In practise the secondary spring means are placed on a circumference of smaller diameter than the main springs.

The advantage of a torsional damper service featuring two successive stiffness stages is to permit more gradual operation than a single stiffness stage, that is as provided by a single kind of spring means.

The spring means are conventionally coil springs disposed circumferentially in openings provided for this purpose in the various rotary elements used.

These springs have a linear displacement/force function. This implies that the function determined by the behaviour of a device of this kind, as expressed in terms of angular displacement/torque, features thresholds determining linear ranges of operation.

In practice, this results in failure to achieve progressive coupling of the various rotating parts.

Apart from the resulting inconveniences of use, the parts wear more quickly.

To remedy the problem of lack of progressive functioning of torsional damper devices with a single stiffness stage, there have been developed more complex devices with two stiffness stages and corresponding stages of relative displacement, the structure and the operation of which have been briefly described hereinabove, or even a greater number of stiffness stages.

It will be obvious that increasing the number of stiffness and relative displacement stages enhances progressive functioning of the device.

It does have a number of disadvantages, however:

On the one hand, the relative complexity of the structure and thus the cost are increased.

On the other hand, the overall axial dimension of the device tends to increase, to provide room for the various spring means.

Accommodating the spring means in openings cut into the rotary elements tends to weaken these elements. In practise, this results in mandatory limits as to the multiplication of the number of stiffness stages.

An object of the present invention is a torsional damper device achieving the required progressive operation without entailing the above-mentioned disadvantages.

SUMMARY OF THE INVENTION

The invention consists in a torsional damper device suitable for automobile vehicles comprising at least a driving part, an intermediate part and a driven part disposed coaxially and rotatable relative to each other within predetermined limits of relative angular displacement, lost motion meshing means between said driving, intermediate and driven parts adapted to determine said predetermined limits of relative angular displacement, first and second circumferentially acting spring means adapted to act circumferentially between said driving, intermediate and driven parts to oppose relative angular displacement thereof for at least two ranges of relative angular displacement, lost motion meshing means between said driving, intermediate and driven parts adapted to define said two ranges of relative angular displacement, a first group of elements in said driving part comprising a friction disk and at least one element supporting and centering it, a guide ring, an annular elastomer member with which one side of said guide ring is constrained to rotate and which has its opposite radial surface constrained to rotate with said intermediate member, means for constraining said first group of elements to rotate with said guide ring, and at least one annular metal part constrained to rotate with and constituting one radial surface of said annular elastomer member, said annular metal part constituting at least part of said first circumferentially acting spring means, wherein an inner part at least of said annular elastomer member has a trapezoidal transverse cross-section with the shorter parallel side of the trapezium nearer the axis of the device.

Advantageously, the driven part is a hub and the device further comprises a hub plate assembly that meshes with the hub and comprises at least one annular elastomer element constituting first circumferentially acting spring means and second circumferentially acting spring means between the hub and the hub plate.

In one embodiment of the invention this hub plate assembly comprises at least two hub plates disposed coaxially at an axial distance from each other, the hub plates being linked to each other by at least one annular elastomer element, a first hub plate being constrained to rotate with a friction facing support disk, a second hub plate being constrained to rotate with a concentric guide ring, and the two hub plates meshing with the hub by respective teeth means with different clearances.

In another embodiment of the invention, the hub plate assembly comprises three separate hub plates, the center one of which is a flat disk defining an axial plane of symmetry of the assembly, two annular elastomer elements disposed between the hub plates and respective teeth means with different clearances whereby the hub plates mesh with the hub.

The second spring means are preferably coil springs.

Alternatively, the second spring means may be elastomer material blocks.

In a particularly advantageous embodiment of the invention, the first and second spring means comprise a single annular elastomer element with axial projections in the vicinity of its inside diameter constituting the first spring means.

One specific advantage of the present invention as compared with the prior art is the enhanced reliability of the hub plates. In conventional torsional damper devices these have openings in them which necessarily weaken them.

Also, being operative in shear between its two radial surfaces, the annular elastomer element introduces non-linearity into the torque transmission function, because of the internal losses inherent to the material.

Such non-linearity introduces desirable damping into the transmission function.

The characteristics and advantages of the invention will emerge from the following description given by way of example with reference to the appended drawings.

BRIEF DESCRIPTION OF THE DRAWINGS

FIG. 2 is a view of the device shown in FIG. 1 in cross-section on the line II—II.

FIG. 4 is a detail view of a section IV of FIG. 2.

FIG. 9 is a partial schematic view in plane elevation of the embodiment of the invention shown in FIGS. 7 and 8.

FIG. 10 is a view in cross-section of a fifth embodiment of the invention.

FIG. 11 is a diagram showing the operation of the embodiment of the invention shown in FIG. 10.

DESCRIPTION OF THE PREFERRED EMBODIMENTS

Figure 1:
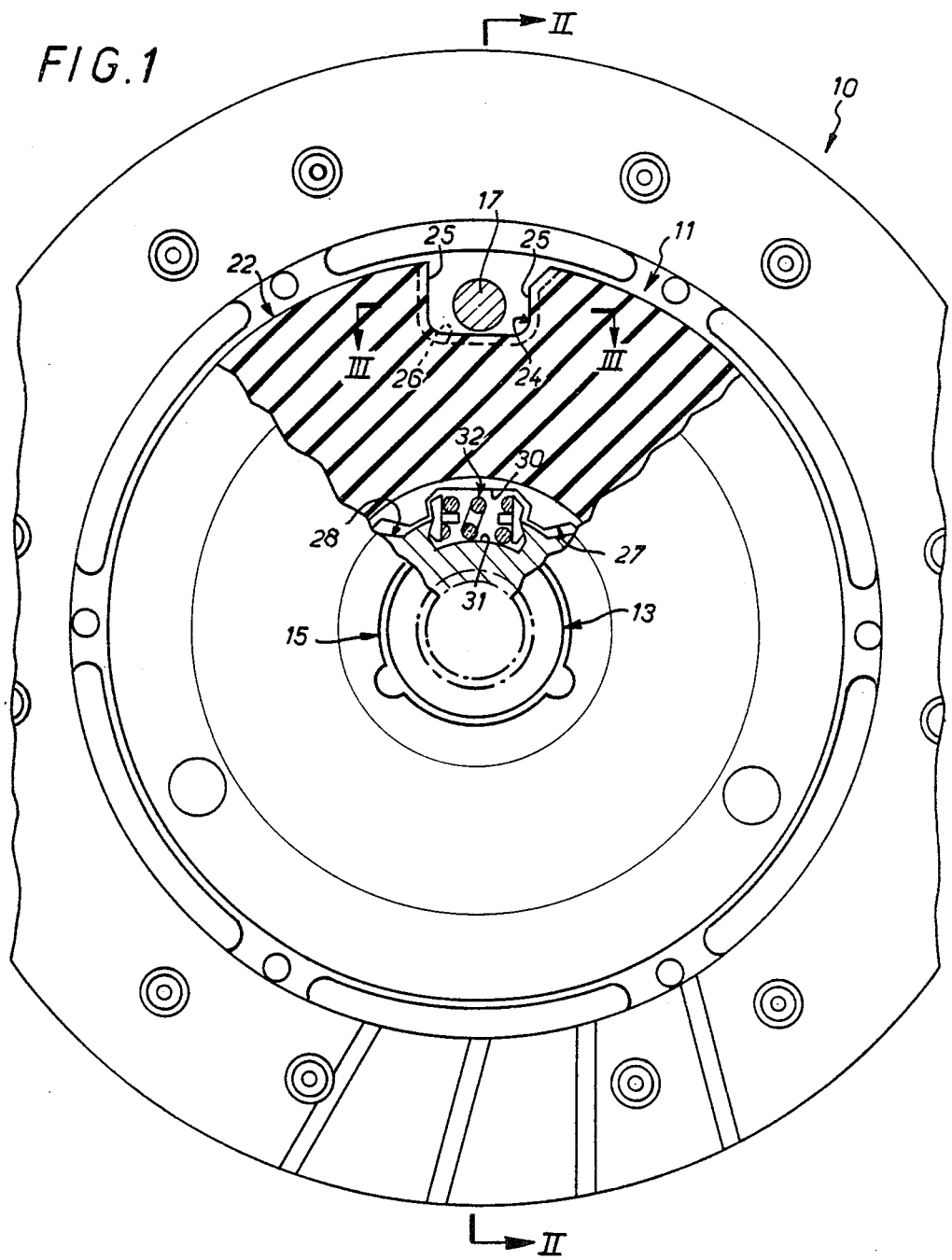
FIG. 1 is a partially cutaway view in elevation of a device in accordance with the invention.
Figure 3:
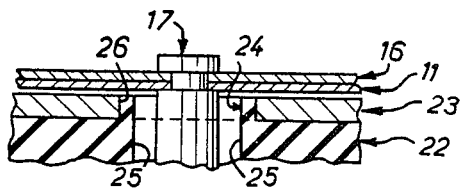
FIG. 3 is a detail view of the same device in cross-section on the line III—III.

The device in accordance with the invention as a whole is indicated by the general reference number 10 and comprises, as shown in FIGS. 1, 2, 3 and 4, a friction facing support flange 11 constrained to rotate with and coaxial with a support flange 16 in turn constrained to rotate with a bearing 14 free to rotate about a hub 13 one end of which it surrounds.

Three spacers here in the form of pegs 17, the ends of which form rivet heads, project axially from the friction facing support disk 11 which they attach to the flange 16.

In more precise terms, the friction facing support disk 11 forms a ring whose radially innermost marginal area is superposed on a peripheral area of the flange 16, so establishing an annular radial contact surface. The three pegs, which are equidistant relative to a general axis 12 of the device in accordance with the invention, are spaced at 120° and pass through the flange and the friction facing support disk that they fasten together rivet fashion.

The other ends of the pegs 17, away from the friction facing support disk, also form a rivet and fasten together a guide ring or washer 18 and an adhesion flange 19.

The washer 18 and the flange 19 feature a flat annular peripheral area by means of which they are fastened together by the heads of the pegs 17, which pass through them in this area, extended by a frustoconical internal radial area.

The frustoconical internal radial area of the flange 18 extends to a bearing 15 with which it is constrained to rotate. The bearing 15 is free to rotate about the hub 13. The flange 19, which does not extend so far radially inwards as the washer 18, is not joined to the bearing 15.

Figure 2A:
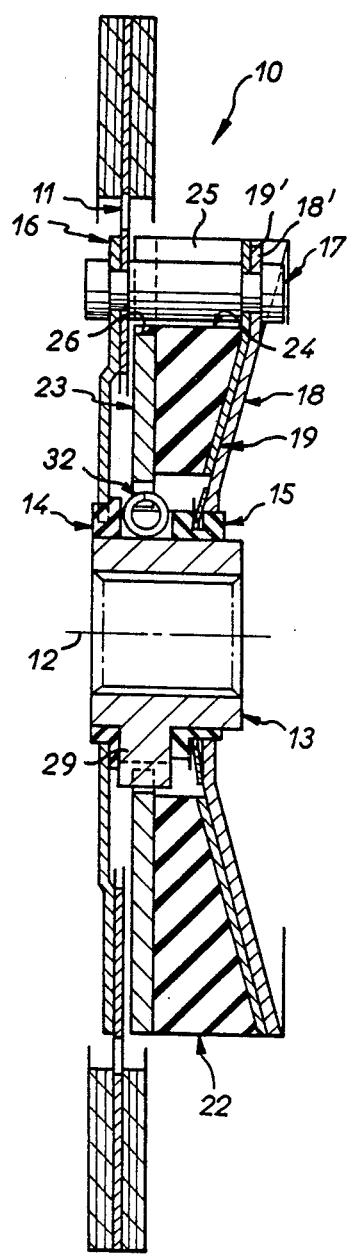
FIG. 2A is a view analogous to FIG. 2 of an alternative embodiment of the invention.

In one embodiment as shown in FIG. 2A the washer 18 and the flange 19 are generally frustoconical, except for respective axial recesses 18' and 19'. These recesses are precisely superposed, lying in a plane normal to the axis of the pegs 17, and are localized around the end of these pegs. The function of these recesses is to provide a fixing surface for the heads of the pegs 17 normal to the axis of each peg, to enable riveting to be achieved under proper conditions.

The guide washer 18 and the adhesion flange 19 are mated together and constrained to rotate together.

As shown by FIG. 4 in particular the rotational coupling between the bearing 15 and the washer 18 is effected by the meshing of three radial projections spaced by 120° on the bearing with three corresponding openings formed for this purpose in the guide washer. A Belleville washer 20 bears on the guide washer 18 and exerts axial pressure on the bearing 15 with which it meshes through the same projections.

The bearing 15 is generally L-shaped in transverse cross-section, the axial part meshing with the washer 18 having the smaller outside diameter. The projections extend to the larger outside diameter of the bearing.

As shown by FIG. 4, the bearing 14 meshes with the flange 16 through three projections in precisely the same way.

The bearings 14 and 15 are advantageously made from a composite material.

Figure 4A:
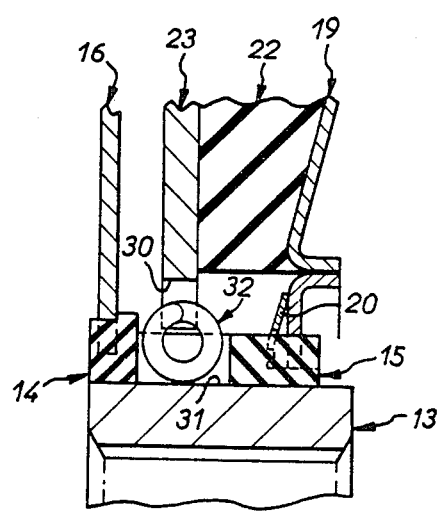
FIG. 4A is a view analogous to FIG. 4 of another embodiment of the invention.

Alternatively, as shown in FIG. 4A, the guide washer 18 may be dispensed with, the flange 19 having in this case an axial lip and the bearing 15 being carried by a flange with an axial lip coupled to the axial lip of the flange 19.

In all embodiments an annular elastomer material element 22 is fastened to the adhesion flange 19 and to a hub plate 23.

In more precise terms, the annular element 22 mates through its two radial surfaces with the adhesion flange 19 and the hub plate 23, to which it is bonded, this method being known per se and making it possible to fasten together a metal element and a composite element, made of an elastomer material, for example, during vulcanization of the latter.

It will be understood that the edge of the flange 19 is situated on a circumference of greater diameter than the inside diameter of the hub plate 23, facilitating the insertion of a tool and making it possible to vulcanize the element 22 onto the hub plate and the flange to form a subassembly without any flashing. As the hub plate 23 is a flat metal disk, the annular element 22 comprises a first peripheral area delimited axially by the hub plate and by the plane peripheral area of the adhesion flange 19 which is parallel to the hub plate.

In this first area are formed three notches 24 extending to a radial height and over a circumferential width enabling relative circumferential movement of the pegs 17 in the notches.

The radial edges 25 of the notches thus form abutments which limit the relative circumferential displacement of the pegs.

Three notches 26 formed in the hub plate are substantially superposed on the notches 24, but are of greater circumferential extent than the notches, so that the pegs 17 initially butt up against the notches 24 of the annular element 22. The annular element 22 features axially projecting lips extending away from the notches 24 which mate with and overlap the edges of the notches 26 of the hub plate.

These projecting lips extend axially over substantially all the thickness of the hub plate 23.

Note that in this way it possible to use a conventional hub and a standard type hub plate without openings.

The annular element 22 has a concentric second area radially inside the first, of trapezoidal cross-section with the shorter parallel side of the trapezium nearer the axis 12.

In the embodiment shown in FIG. 2A, in which the washer 18 and the flange 19 are frustoconical with locally parallel areas, the annular element 22 naturally matches the shape of the washer 18 and of the flange.

The trapezoidal cross-section is delimited on one side by the plane hub plate and on the other side by the frustoconical part of the flange 19.

The radial extent of the annular element 22 is identical to that of the flange 19 and the inside circumference of the element 22 is radially spaced from the hub plate 13 that it surrounds and nearer the center than that of the flange 19.

The annular element 22 is advantageously made from a composite elastomer material having a fibrous armature disposed circumferentially.

The hub plate 23 has at its inside circumference teeth 27 which mesh with corresponding teeth 28 of complementary configuration formed at the periphery of a radial projection or flange 29 of the hub 13 with circumferential clearance determining the relative angular displacement between the hub plate 23 and the hub 13.

Circumferential half-openings 31 and 30 in face-to-face relationship in the radial projection 29 on the hub 13 and the inside circumference of the hub plate 23 constitute, when they are lined up with each other, an opening whose radial edges define the two halves of an X, the or each opening thus formed accommodating a coil spring 32 disposed circumferentially and, by compression of the spring 32 between an edge of the half-opening 30 in the hub plate 23 and an edge of the half-opening 31 of the hub 13, opposing any relative angular displacement between the hub plate and the hub.

The friction facing support flange 11, the support flange 16, the pegs 17, the guide washer 18, the flange 19 and the bearings 14 and 15 are thus constrained to rotate together. The assembly of these elements constitutes a driving part.

The hub plate 23 constitutes an intermediate part.

The hub 13 constitutes a driven part.

The annular elastomer element 22, which is fastened by one of its radial surfaces to the driving part, transmits a torque impressed on this part by circumferential shear forces to the intermediate part (the hub plate 23) to which it is fastened by its other radial surface.

Thus the element 22 constitutes first circumferentially acting spring means.

These spring means oppose relative angular displacement between the pegs 17 on the driving part and the abutments 25 of the notches 24 in the annular element 22 superposed on the notches 26 in the hub plate 23, the notches and the pegs constituting meshing means between the driving part and the intermediate part.

The hub plate 23 meshes with clearance with the hub 13 (meaning the driven part), relative angular displacement between these two parts being opposed by springs 32.

Thus the springs 32 constitutes second circumferentially acting spring means of lower stiffness, in particular for good filtering of idling noise.

In this embodiment of the invention the hub plate assembly comprises a guide washer 18, a flange 19, first spring means consisting of an annular element 22, a hub plate 23 and second spring means consisting of springs 32 disposed circumferentially and partially accommodated in the half-openings 30 in the hub plate.

In this case it is convenient to consider the hub plate assembly as one entity comprising at least two spring means.

The first spring means advantageously have greater stiffness than the second spring means, being disposed radially above these second means.

Thus when torque is transmitted by the friction facing support disk to the hub ("forward" operation) or when the friction facing support disk tends to oppose an inertia torque transmitted to the hub ("reverse" operation), relative angular displacement occurs between these two elements through the intermediary of the hub plate assembly.

In more precise terms, the second spring means, of lower stiffness, are compressed until the teeth through which the hub and the hub plate mesh with each other come into abutting relationship.

Once the hub and the hub plate are meshed together and constrained to rotate in the direction of the relative torque between the driving part and driven part, this relative torque tends to load the first spring means, of greater stiffness, which because of their greater stiffness behave as rigid blocks during the first phase.

If the relative torque is greater than the resisting torque developed by the first and second spring means, when these reach the saturation point, which in theory will happen only under exceptional circumstances (in particular jerking, etc), the pegs 17 come into contact with the abutments 25, this occuring without any shock by virtue of the fact that the abutments consist of a lip of the elastomer material covering the edges of the notch in the hub plate, which is progressively crushed.

In this case coupling is direct until the relative torque reduces.

Figure 5:
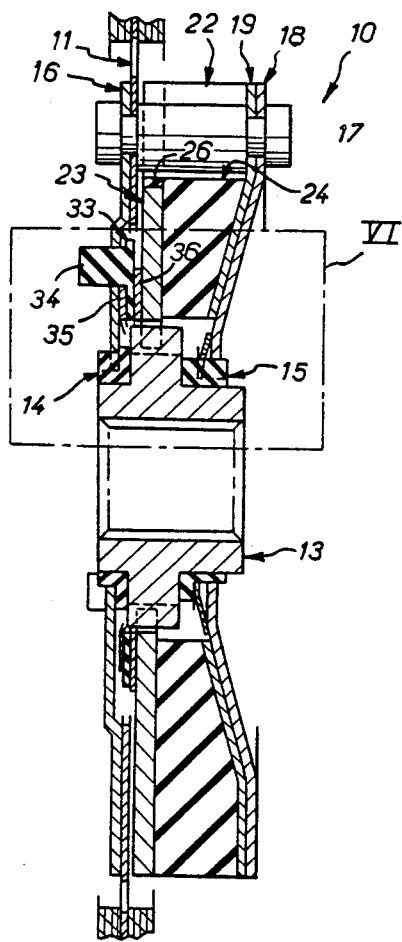
FIG. 5 is a view in cross-section of a further embodiment of the invention.
Figure 6:
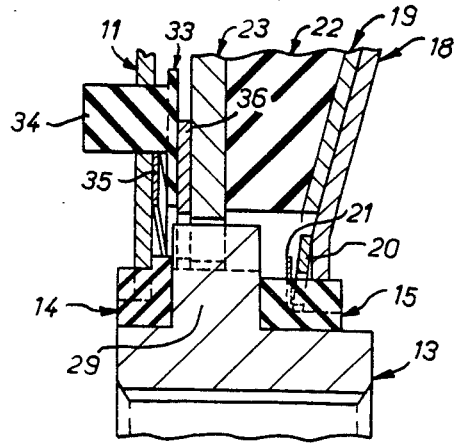
FIG. 6 is a detail view of the part VI of FIG. 5.

FIGS. 5 and 6 show an embodiment of the invention in which a bearing washer 33 with substantially cylindrical axial projections 34 on one side is pressed against the free side of the hub plate 23 by a spring washer 35, of the corrugated Belleville washer type, for example, bearing against the flange 16.

The projections 34 enter orifices provided for this purpose in the flange 16 with sufficient clearance to permit relative axial movement between the bearing washer 33 and the flange 16, whilst constraining them to rotate together.

The bearing washer 33 is advantageously made from a composite material and bears on a friction washer 36 constrained to rotate with the hub 13.

Thus relative angular displacement between the driving part and the driven part is opposed by the friction generated by the contact between the bearing washer 33 and the friction washer 36 respectively fastened to the driving and driven parts, the friction force being determined by the axial force applied by the Belleville washer 35.

The friction forces, of different nature to the elastic forces, therefore combine with the latter, as determined by the two spring means, to confer the necessary progressive characteristics on the driving of the driven part by the driving part.

Figure 7:
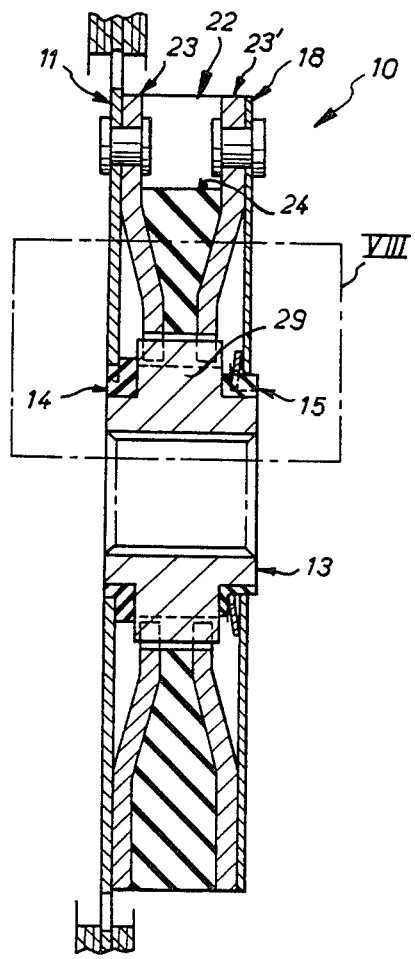
FIG. 7 is a view in cross-section of a fourth embodiment of the invention.
Figure 8:
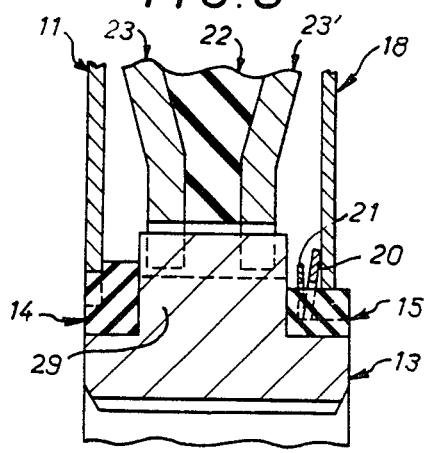
FIG. 8 is a detail view of the part VIII of FIG. 7.

In another embodiment shown in FIGS. 7 and 8, a hub plate assembly comprises two substantially identical hub plates 23 and 23' disposed in face-to-face relationship and each having a peripheral area in the form of a flat disk, a frustoconial intermediate area and an inside marginal area in the form of a flat disk.

An annular elastomer element 22 is disposed between and bonded to the two facing surfaces of the two hub plates which mesh with a radial projection 29 on the hub 13 with two different clearances.

The hub plate 23 is riveted to the friction facing support disk 11 which is flat and directly mounted on, and so constrained to rotate with, the bearing 14, which is free to rotate about one end of the hub 13.

The second hub plate 23' is riveted to a flat guide washer 18 which meshes with a bearing pushed in the axial direction by a Belleville washer bearing on the guide washer 18 and, as described previously, is adapted to butt up against the radial projection 29 through the intermediary of a bearing washer.

Relative angular displacement between the hub plate 23 and the hub 13 is of greater extent than relative angular displacement between the hub plate 23' and the hub.

Female teeth 27 (FIG. 9) formed in the hub plate 23 and wider female teeth 27' formed in the hub plate 23' mesh with male teeth 28 on the radial projection 29 of the hub.

As previously described, half-openings formed in the hub plate 23 and in the projection 29 on the hub are disposed in face-to-face relationship to accommodate the second spring means.

The two plates 23 and 23' may of course be identical, in which case the female teeth 27 and 27' are identical and the male teeth 28 on the radial projection 29 on the hub are different.

In this embodiment the second spring means comprise substantially parallelepipedal, so-called "X" blocks with lateral notches at an obtuse angle giving an overall X shape. These X blocks are advantageously of an elastomer material.

The annular elastomer element 22 constitutes the first spring means, of greater stiffness than the second spring means because of its radial position and its radial extent.

The two spring means successively oppose the relative torque between the driving and driven parts in a similar way to what has been described already.

FIGS. 10 and 11 show another embodiment comprising three different degrees of relative angular displacement and three different degrees of stiffness.

In this case the hub plate assembly comprises three concentric hub plates 23, 23', 23" disposed axially and separated by two annular elastomer elements 22 and 22'. A first end hub plate 23 is attached to the friction facing support disk 11 and to the support flange 16 which is axially offset towards the outside.

This hub plate is bonded to a first annular elastomer element 22 which has, as in the first embodiment described, a peripheral part of rectangular transverse cross-section and an inner part of trapezoidal cross-section.

The first hub plate 23 is shaped to match a first radial surface of this annular element 22.

The central second hub plate 23' is a flat disk disposed axially in a median position to which are bonded the flat sides of the elements 22 and 22'.

The second annular elastomer element 22' is substantially identical to the first 22.

The third hub plate 23" constitutes a guide ring and is symmetrical to the first hub plate 23 relative to the plane of the second hub plate 23', and is the same shape as the first hub plate 23.

All three hub plates 23, 23', 23" mesh through female teeth with male teeth on the radial projection 29 on the hub plate, with respective different angular clearances in increasing order.

The table below explains the various combinations of clearances employed:

| Order of contact | Spring means |
| --- | --- |
| 1 | 33 |
| 2 | 22 + 22' |
| 3 | 22' |

Once the first spring means have reached saturation point the elastomer elements 22 and 22' tend to oppose residual angular displacement between the second hub plate 23' and the hub. They thus constitute second spring means.

After the pegs contact the second hub plate 23' there is residual angular displacement between the third hub plate 23" and the hub, still opposed by the second spring means, but only with the remaining part of the annular elastomer element 22'.

Pegs 17 fastening together the friction facing support disk 11, the support flange 16 and the third hub plate 23" pass through notches in the first and second hub plates.

FIG. 11 is a schematic representation of the various angular displacements between the three hub plates 23, 23' and 23" and the radial projection on the hub 29, of which only one tooth 28 is shown.

As previously described, the circumferential displacement of the pegs between the radial edges of the notches forming abutments determines the possible range of relative angular displacement between the successive hub plates.

The supports of the thus constituted hub plate assembly on the hub are bearings 14 and 15 similar to those used in the previously described embodiments.

Figure 12:
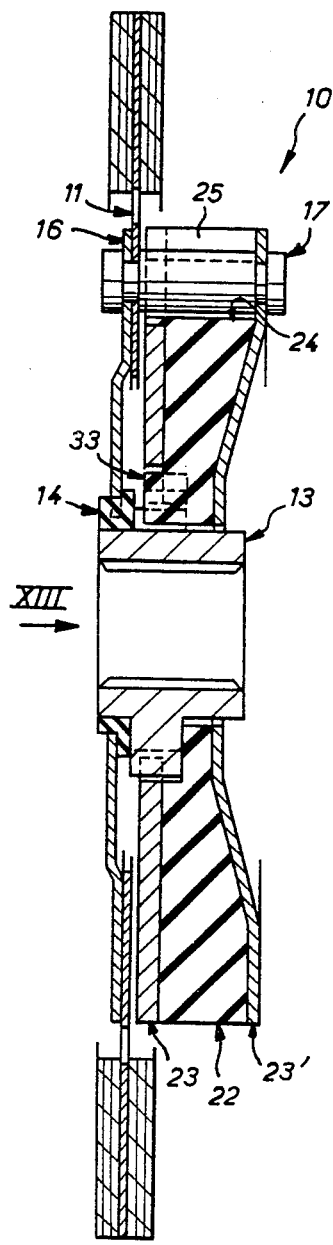
FIG. 12 is a view in cross-section of a sixth embodiment of the invention.
Figure 13:
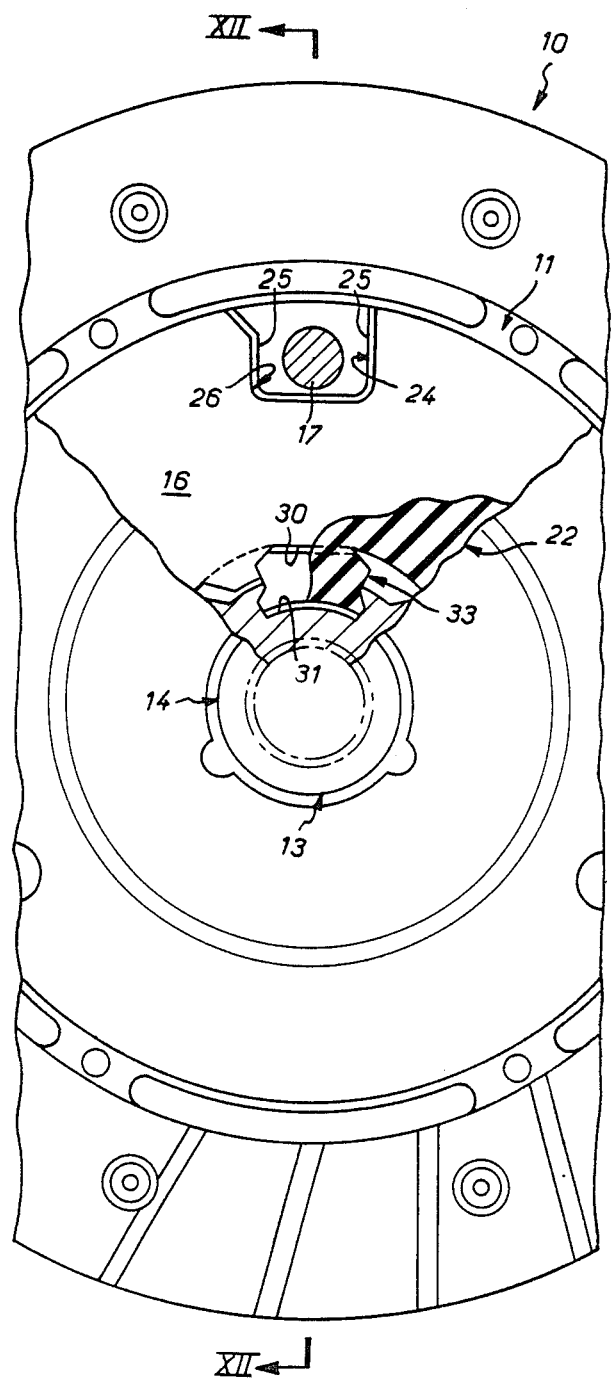
FIG. 13 is a partially cutaway view in plane elevation of the embodiment of the invention shown in FIG. 12.

FIGS. 12 and 13 show another embodiment of the invention in which a plane "main" hub plate 23 is disposed in face-to-face relationship with a "secondary" hub plate 23' which constitutes a guide ring, of partly frustoconical and partly plane shape, as described before in connection with the other embodiments, from which it is separated by an annular elastomer element 22 the two sides of which are bonded to the two hub plates.

The secondary hub plate 23' is fastened to the friction facing support disk 11 by three pegs 17.

The annular elastomer element 22 has notches at its periphery, as does the main hub plate 23, permitting circumferential displacement of the pegs 17, their edges being covered by axially projecting borders of the element 22, in a similar way to that discussed in the description of the first embodiment of the invention.

The main hub plate 23 meshes through teeth at its inside circumference with corresponding teeth on the hub, as previously described.

Similarly, facing half-openings cooperate to form openings adapted to accommodate the second spring means.

In this embodiment of the invention the second spring means comprise X blocks constituted by axial projections 33 on the annular elastomer element 22 forming also and primarily the first spring means.

Thus in the hub plate assembly of this specific embodiment of the invention the first and second spring means are provided by a single element, the annular elastomer element 22 provided with projections.

This obviously simplifies the fabrication of the hub plate assembly.

This embodiment of the invention, which makes it possible, as in the second variant execution described, to obtain proper progressive action of the two spring means, both of which comprise elastomer elements, enables conventional parts, namely conventional hub plates, to be used.

As will be obvious from the foregoing description, it is a simple matter to create a subassembly comprising hub plate, annular elastomer element and/or flange or other hub plate in a production facility and the other components in another production facility and then to assemble the whole.

The invention is obviously not limited to the embodiments described, but encompasses any combination of the various features described and any extrapolation thereof, in particular the multiplicity of spring means, and any adaptation or improvement judged beneficial by those skilled in the art.

We claim:

1. Torsional damper device suitable for automobile vehicles, comprising at least one driving part, an intermediate part and a driven part disposed coaxially and rotatable relative to each other within predetermined limits of relative angular displacement, lost motion meshing means operatively disposed between said driving and intermediate parts and between said intermediate and driven parts for defining said predetermined limits of relative angular displacement, first and second circumferentially acting resilient means operably disposed between said driving, intermediate and driven parts to oppose relative angular displacement thereof for at least two ranges of relative angular displacement, said lost motion meshing means defining said ranges of relative angular displacement, said driven part comprising a hub, said intermediate part comprising a hub plate disposed annularly of said hub, and said driving part comprising a friction disk, means for supporting and centering said friction disk, a guide ring axially spaced from said means for supporting and centering said friction disk, and means for constraining said means for supporting and centering said friction disk for rotation with said guide ring, said constraining means being radially spaced from said hub proximate to the outer periphery of said guide ring, an annular elastomer member defining at least in part said first circumferentially acting resilient means, said elastomer member having at least in part a trapezoidal cross section with a shorter parallel side of said trapezoidal cross section near the axis of the device and two opposed generally radially extending sides, means constraining one of said radially extending sides to rotate with said guide ring, and means constraining the other of said radially extending sides to rotate with said hub plate, said elastomer member having an outer peripheral portion with opposed parallel radial sides including axially extending recesses for receiving said constraining means, said guide ring being part frustoconical and having a portion complementary to that of said one opposed radially extending side of said elastomer member and a portion complementary to said outer peripheral portion of said elastomer member.

2. Torsional damper device according to claim 1, wherein said second circumferentially acting resilient means is operatively disposed between said hub and said hub plate.

3. Torsional damper device according to claim 1, wherein said means for supporting and centering said friction disk comprises a hub flange disposed annularly of said hub.

4. Torsional device according to claim 1, wherein there are two said hub plates including a central hub plate comprising a flat disk, and an end hub plate, and a second annular elastomer member being affixed to said central hub plate and said end hub plate, said lost motion meshing means comprising meshing teeth at the inner periphery of each of said hub plates cooperable with meshing teething on said hub to define respective clearances therewith.

5. Torsional damper device according to claim 1, wherein said lost motion meshing means comprises a toothed radial projection on said hub adapted to mesh with clearance with said hub plate.

6. Torsional damper device according to claim 5, wherein said toothed radial projection comprises teeth formed by radially outwardly opening parallel axial notches.

7. Torsional damper device according to claim 5, wherein said hub and said hub plate comprise respective half-openings in face-to-face relationship, said second circumferentially acting resilient means being disposed in said openings in a generally circumferential direction so as to be compressed between said hub plate and said hub.

8. Torsional damper device according to claim 7, wherein said second circumferentially acting resilient means comprise springs.

9. Torsional damper device according to claim 7, wherein said second circumferentially acting resilient means comprise blocks of elastomer material.

10. Torsional damper device according to claim 1, comprising at least one friction washer, and an axially acting spring washer, said spring washer urging said friction washer against said hub plate, said spring washer bearing against said means for supporting and centering said friction disk, said friction washer opposing relative angular displacement between said hub plate and said means for supporting and centering said friction disk.

11. Torsional damper device according to claim 1, wherein said one radially extending side of said elastomer member is bonded to a metal adhesion plate and means constraining said adhesion plate for rotation with said guide ring.

12. Torsional damper device according to claim 11, wherein said adhesion plate and said guide ring are of complementary configuration.

13. Torsional damper device according to claim 1, wherein the other of said radially extending sides of said elastomer member is bonded to said hub plate.

14. Torsional damper device suitable for automobile vehicles, comprising at least one driving part, an intermediate part and a driven part disposed coaxially and rotatable relative to each other within predetermined limits of relative angular displacement, lost motion meshing means operatively disposed between said driving, intermediate and driven parts for defining said predetermined limits of relative angular displacement, first and second circumferentially acting resilient means operably disposed between said driving, intermediate and driven parts to oppose relative angular displacement thereof for at least two ranges of relative angular displacement, said lost motion meshing means defining said ranges of relative angular displacement, said driving part comprising a friction disk, means for supporting and centering said friction disk, a guide ring axially spaced from said means for supporting and centering said friction disk, and means for constraining said means for supporting and centering said friction disk for rotation with said guide ring, an annular elastomer member defining at least in part said first circumferentially acting resilient means, said elastomer member having at least in part a trapezodial cross section with a shorter parallel side of said trapezoidal cross section near the axis of the device and two opposed generally radially extending sides, means contraining one of said radially extending sides to rotate with said guide ring, means constraining the other of said radially extending sides to rotate with said intermediate part said driven part being a hub and said intermediate part being a hub plate arranged annularly around said hub, said hub having a toothed radial projection adapted to mesh with clearance with said hub plate, said toothed radial projection and said hub plate comprising respective half-openings in face-to-face relationship, and said second circumferentially acting resilient means being disposed in said openings in a generally circumferential direction so as to be compressed between said hub plate and said hub, said second resilient means being formed in one piece with said annular elastomer member and comprising axial projections in the vicinity of the inner periphery of said elastomer member.

* * * * *